United States Patent [19]
Fliearman et al.

[11] Patent Number: 6,067,495
[45] Date of Patent: *May 23, 2000

[54] ACCELERATION BASED SHIFT STRATEGY FOR AN AUTOMATIC TRANSMISSION

[75] Inventors: Steven R. Fliearman, Howell; Mark R. Foeller, Grass Lake; Kenneth J. Potter, Almont; Dennis Zeiger, Royal Oak, all of Mich.

[73] Assignee: Chrysler Corporation, Auburn Hills, Mich.

[*] Notice: This patent is subject to a terminal disclaimer.

[21] Appl. No.: 08/881,119

[22] Filed: Jun. 24, 1997

[51] Int. Cl.$^7$ ............................... G06G 7/70; B60K 41/04
[52] U.S. Cl. ................................. 701/55; 701/56; 701/64; 477/108; 477/120; 74/335; 74/336 R
[58] Field of Search ................................... 701/51, 52, 55, 701/53, 58, 66, 93, 62, 65, 54; 477/108, 148, 149, 110, 120, 133, 155; 74/335, 336 R

[56] References Cited

U.S. PATENT DOCUMENTS

| | | | |
|---|---|---|---|
| 4,875,391 | 10/1989 | Leising et al. | 477/155 |
| 4,905,545 | 3/1990 | Leising et al. | 477/133 |
| 4,951,200 | 8/1990 | Leising et al. | 701/58 |
| 5,241,476 | 8/1993 | Benford et al. | 701/62 |
| 5,245,893 | 9/1993 | Koening et al. | 701/54 |
| 5,669,580 | 9/1997 | Dourra et al. | 477/108 |
| 5,685,801 | 11/1997 | Benford et al. | 477/108 |
| 5,738,605 | 4/1998 | Fliearman et al. | 477/108 |
| 5,778,331 | 7/1998 | Leising et al. | 701/93 |
| 5,794,170 | 8/1998 | Kuroda et al. | 701/93 |

*Primary Examiner*—Jacques H. Louis-Jacques
*Attorney, Agent, or Firm*—Mark P. Calcaterra

[57] ABSTRACT

An shift control strategy for controlling an automatic transmission based on acceleration. The shift control strategy determines a learned vehicle inertia as well as road load torque and expected torque in an upshift gear. A projected post shift acceleration is predicted based on the expected torque, road load torque and inertia of the vehicle. If vehicle speed and throttle position are within an allowable shift zone and if the predicted post shift acceleration exceeds a threshold value, the vehicle automatic transmission is allowed to upshift. The predicted post upshift acceleration value is determined as a function of a selected one of the possible downshifts and is compared to a threshold value. A downshift of the automatic transmission to the selected downshift is allowed if the post downshift acceleration value is less than the threshold value.

4 Claims, 5 Drawing Sheets

ACCELERATION BASED SHIFT STRATEGY FOR AN AUTOMATIC TRANSMISSION

BACKGROUND OF THE INVENTION

1. Technical Field

The present invention relates generally to automatic transmission control for an automotive vehicle and, more particularly, to an acceleration based shift control strategy for controlling the gear shifting of an automatic transmission.

2. Discussion

Automotive vehicles generally incorporate a motive force system having three basic components: an engine, a powertrain and wheels. The engine produces force by converting chemical energy from a liquid fuel into the mechanical energy of motion. The powertrain transmits the resultant force of this kinetic energy to the wheels which frictionally contact a surface for moving the vehicle. The main component of the powertrain is the transmission, which transmits engine torque over a relatively limited angular speed range to the wheels over a broader speed range, in accordance with the tractive-power demand of the vehicle. The transmission also controls the direction of rotation applied to the wheels so that the vehicle may be driven both forward and backward.

One advanced type of transmission is a four speed electronically controlled automatic transmission with overdrive. Examples of this type of electronically controlled automatic transmission are described in U.S. Pat. No. 4,875,391, entitled "An Electronically-Controlled, Adaptive Automatic Transmission System", issued on Oct. 24, 1989 to Leising et al; U.S. Pat. No. 4,905,545, entitled "Method of Controlling the Speed Change of a Kickdown Shift for an Electronic Transmission System", issued on Mar. 6, 1990 to Leising et al and U.S. Pat. No. 4,951,200, entitled "Method of Controlling the Apply Element During a Kickdown Shift for an Electronic Automatic Transmission System", issued on Aug. 21, 1990 to Leising et al. These patents are owned by the Assignee of the present application and are incorporated herein by reference. However, it should be appreciated that the principles of the present invention are not limited to any particular automatic transmission, whether electronic or hydraulic controlled and that the present invention may be applied to a wide variety of other powertrain configurations.

Automotive vehicles are commonly equipped with electronic control systems such as a powertrain control system for controlling the operation of the engine and drivetrain of the vehicle. The electronic powertrain control system includes a microcomputer-based transmission controller capable of receiving and monitoring input signals indicative of various vehicle operating conditions such as engine speed, torque converter turbine speed, output vehicle speed, throttle angle position, brake application, hydraulic pressures, a driver selected gear or operating condition (PRNDL), engine coolant temperature and/or the ambient air temperature. Based on the information contained in the monitored signals, the controller generates command or control signals for causing actuation of solenoid-actuated valves to regulate the application and release of fluid pressure to and from apply cavities of clutches or frictional elements of the transmission. Accordingly, the transmission controller is typically programmed to execute predetermined shift schedules stored in memory of the controller through appropriate command signals to the solenoid-actuated valves.

In some conventional automatic transmission control routines, the use of a predetermined shift schedule provides allowable gear shifts based on a speed value and percentage of throttle opening. An automatic transmission gear upshift generally follows a predetermined upshift curve, while a transmission downshift follows a predetermined downshift curve. The upshift and downshift shift points are determined as a function of output shaft speed and percentage of throttle opening and are commonly obtained from the upshift and downshift curves. With the conventional approach, the shift points remain constant as long as the vehicle can maintain the desired shift speed.

Conventional automatic transmission gear shifting approaches provide shift points that compromise for various possible loads on a vehicle. For example, a vehicle that is lightly loaded may realize a shift point that occurs later than desired because of compromises taken into consideration for heavier vehicle loading conditions. Moreover, this problem is amplified for downhill vehicle travel conditions. Similarly, for a vehicle that is heavily loaded, the shift points are generally compromised for lighter vehicle loading conditions, and this may result in lugging of the engine. This is especially true for heavily loaded vehicles traveling uphill and can lead to a gear "shift hunting" condition in which an upshift gear does not provide sufficient torque to maintain vehicle speed and results in cyclical upshift and downshift gear changes.

It is therefore one object of the present invention to provide for a system and method of controlling gear shifting of an automatic transmission for a motor vehicle in a manner that is adaptive to vehicle loading conditions.

It is another object of the present invention to provide for such a system and method of controlling automatic transmission upshifts that adapts to heavy vehicle load increases.

It is also an object of the present invention to provide for such a system and method of controlling downshifting of the automatic transmission taking into consideration lessened vehicle load conditions.

Further, it is another object of the present invention to monitor torque and vehicle load and predict available acceleration to control transmission gear shifting of an automatic transmission to accommodate for different load conditions on the vehicle.

SUMMARY OF THE INVENTION

To achieve the foregoing objectives, the present invention is an adaptive transmission control strategy for controlling shifting of an automatic transmission of a vehicle to accommodate various loads on the vehicle. Following stopping of the vehicle, an approximate learned vehicle inertia is determined and used to determine road load torque. With the automatic transmission engaged in a lower gear, the output torque is determined for the lower gear and a predicted torque available in an upshift condition of the transmission to an upper gear is determined. Projected post shift acceleration available in the upper gear is predicted and compared with a threshold value. Provided the shift schedule point is within an allowable shift zone and if the predicted post shift acceleration value exceeds the threshold value, the automatic transmission shifts to the upshift gear. For a downshift, projected downshift acceleration is predicted for a selected one of the possible downshifts and is compared to a threshold value. Provided the shift schedule point is within an allowable shift zone and if the predicted post shift deceleration value is less than the threshold value, the automatic transmission shifts to the selected downshift gear.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
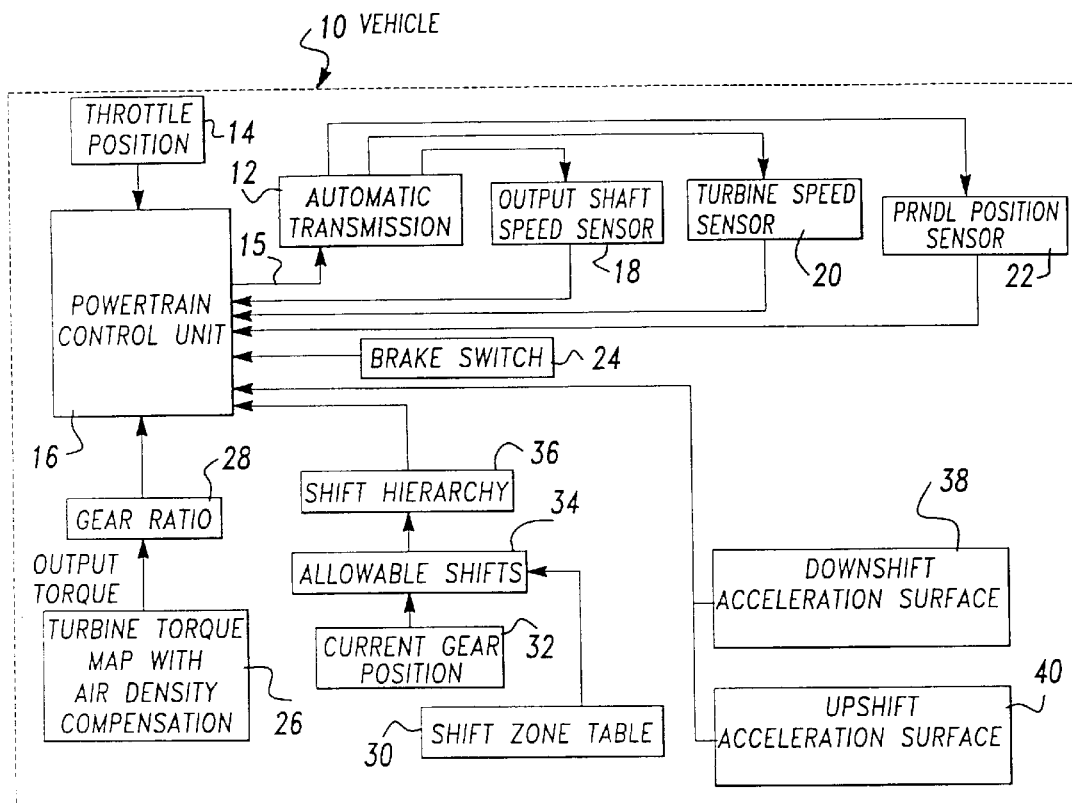
FIG. 1 is a block diagram illustrating a vehicle equipped with an automatic transmission controlled in accordance with an adaptive acceleration based shift control strategy according to the present invention.

Turning now to FIG. 1, a vehicle 10 is provided as a block equipped with an automatic transmission 12 that is controlled so as to shift the automatic transmission among the available gear shifts. The automatic transmission 12 is advantageously controlled in accordance with an acceleration based shift control routine which monitors acceleration, torque and load, predicts the availability of post shift acceleration and determines the appropriate upshift and downshift shift points of the automatic transmission. While the present invention is described herein in connection with an electronic or hydraulic controlled four-speed transmission, it should be appreciated that various other automatic transmissions may be employed in connection with the shift control strategy of the present invention.

The vehicle's powertrain control unit 16 is in communication with the automatic transmission 12. The powertrain control unit 16 preferably is microprocessor-based and includes memory which contains the shift control routines for determining gear shift points and controlling gear shifting of the automatic transmission 12. While the powertrain control unit 16 is described as containing the acceleration based shift control routine and other transmission control routines, it should be appreciated that the shift control routine and other transmission control routines could alternately be provided in other control devices such as a transmission control module.

The powertrain control unit 16 receives various vehicle parameters and determines the shift points for initiating gear shifts of the automatic transmission 12 based upon a predetermined shift schedule, as well as upshift and downshift control routines provided with the shift control routine of the present invention. In doing so, the powertrain control unit 16 outputs a shift control signal 15 to the automatic transmission 12 to control upshifting and downshifting of the automatic transmission 12.

The vehicle 10 is equipped with output shaft speed sensor 18, turbine speed sensor 20 and driver selected transmission position (PRNDL) sensor 22. Each of sensors 18, 20 and 22 senses signals associated with the automatic transmission 12 and provides an output to the powertrain control unit 16. Output shaft speed sensor 18 provides an indication of the rotational speed of the transmission output shaft, while the turbine speed sensor 20 provides an indication of the rotational speed of the turbine output shaft of the transmission. The driver selected transmission position sensor 22 provides an indication of the manually selectable transmission operating mode. The powertrain control unit 16 also receives an input from a brake switch sensor 24 which provides a brake actuation signal. Further, powertrain control unit 16 receives a signal from a throttle position sensor 14 which is indicative of the position of the throttle that is controlled in response to either driver actuation of the accelerator pedal or a cruise control system, if employed.

It should be appreciated that the powertrain control unit 16 typically receives various other inputs such as coolant temperature, ambient temperature, battery, distributor and ignition switch information as is generally provided to the powertrain control unit in a motor vehicle. It should also be understood that the powertrain control unit 16, or a transmission control module (not shown), typically receives various other signals such as a pressure switch input, a manifold absolute pressure (MAP) signal, cruise control signals and vehicle speed signals. It should further be appreciated that various signals could be received via a communication line or network such as a Chrysler Collision Detection (CCD) network and such a network may interconnect a transmission control module with the powertrain control unit 16.

The powertrain control unit 16 further receives a converted turbine torque signal from a torque turbine mapped surface 26 with air density compensation which is converted via a gear ratio converter 28. Powertrain control unit 16 also receives a shift choices signal from shift hierarchy table 36 which provides an ordered selection of available gear shifts. Allowable shifts block 34 determines which gear shifts are available based on the received current gear position from block 32 and a shift zone table 30, and passes the allowable shifts onto shift hierarchy table 36 for consideration therewith. In addition, powertrain control unit 16 receives a downshift acceleration signal from downshift acceleration surface 38 and an upshift acceleration signal from upshift acceleration surface 40. The shift hierarchy table 36, turbine torque mapped surface 26 and shift zone table 30, as well as downshift acceleration surface 38 and upshift acceleration surface 40 are provided in mapped surfaces or tables as will be explained hereinafter.

The shift hierarchy table 36 includes both an upshift hierarchy table and a downshift hierarchy table. One example of an upshift hierarchy table is provided as follows:

| UPSHIFT HIERARCHY | | | | | | | |
|---|---|---|---|---|---|---|---|
| PRIORITY | CURRENT GEAR | | | | | | |
| INDEX | 1 | 2 | 2L | 3 | 3L | 4 | 4L |
| 1 | 3L | 4L | 4L | 4L | 4L | 4L | 4L |
| 2 | 3 | 4 | 4 | 4 | 4 | 4 | 4L |
| 3 | 2L | 3L | 3L | 3L | 3L | 4 | 4L |
| 4 | 2 | 3 | 3 | 3 | 3L | 4 | 4L |
| 5 | 1 | 2L | 2L | 3 | 3L | 4 | 4L |
| 6 | 1 | 2 | 2L | 3 | 3L | 4 | 4L |

The upshift hierarchy table provides ordered priority of available gear shift selections for each of the potential current gears. The upshift hierarchy table lists in prioritized order the possible upshifts that can be considered. For example, with the current gear being second gear, the upshift hierarchy table will first look to see if an upshift to fourth gear lock (e.g., with the converter clutch locked) is appropriate. In decreasing order, the upshift hierarchy table provides subsequent consecutive choices of fourth gear, third gear lock, third gear, second gear lock, and lastly currently engaged second gear.

One example of a downshift hierarchy table is provided as follows:

| | DOWNSHIFT HIERARCHY | | | | | | |
|---|---|---|---|---|---|---|---|
| PRIORITY | CURRENT GEAR | | | | | | |
| INDEX | 1 | 2 | 2L | 3 | 3L | 4 | 4L |
| 1 | 1 | 1 | 2 | 2L | 3 | 3L | 4 |
| 2 | 1 | 1 | 1 | 2 | 2L | 3 | 3L |
| 3 | 1 | 1 | 1 | 1 | 2 | 2L | 3 |
| 4 | 1 | 1 | 1 | 1 | 1 | 2 | 2L |
| 5 | 1 | 1 | 1 | 1 | 1 | 1 | 2 |
| 6 | 1 | 1 | 1 | 1 | 1 | 1 | 1 |

The downshift hierarchy table likewise provides an ordered priority of transmission gear downshifts for each of the potential current gears. The downshift hierarchy table lists in prioritized order the possible downshifts that can be considered. For example, when engaged in fourth gear, the downshift hierarchy table prioritizes potential gear shifts as follows: third gear lock, third gear, second gear lock, second gear, and lastly considers first gear. The priority for upshifting and downshifting preferably takes into consideration adequate achievable acceleration or deceleration and fuel economy. While examples of upshift and downshift hierarchy tables are provided above, it should be appreciated that other prioritized gear shift orders may be provided.

Figure 2:
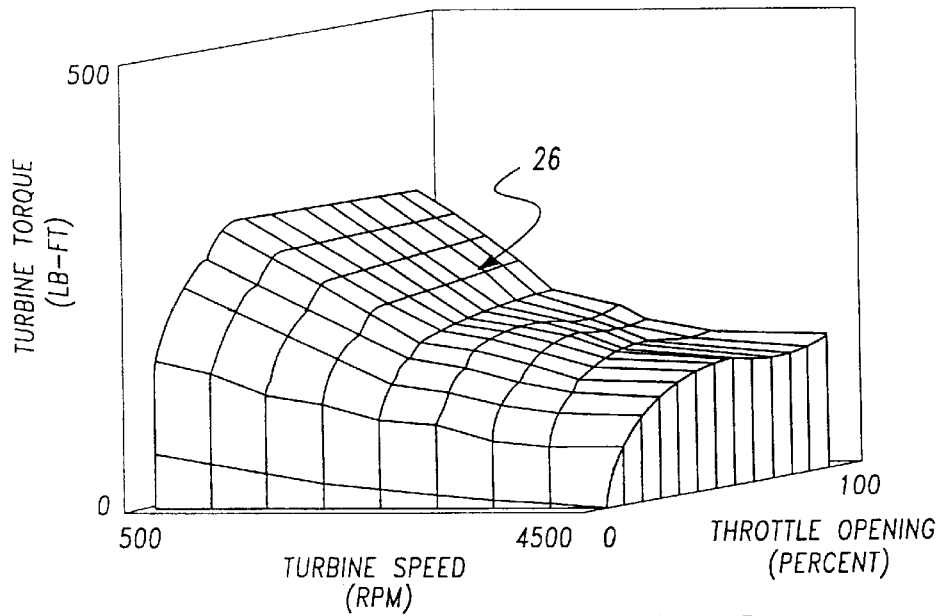
FIG. 2 is a three-dimensional look-up surface which provides turbine torque based on turbine speed and throttle opening percentage.

The turbine torque mapped surface 26 is shown in greater detail in FIG. 2. Turbine torque mapped surface 26 is a three-dimensional surface containing stored turbine torque (LB-FT) values based on turbine speed (RPM) and throttle percentage opening . Given the turbine speed and throttle opening percentage, the appropriate turbine torque can be looked up from turbine torque mapped surface 26. The determined turbine torque value is then converted by the gear ratio converter 28 and thereafter supplied to the powertrain control unit 16 as an output torque signal. The input turbine torque is therefore converted in accordance with the gear ratio to provide an output value indicative of the transmission output torque.

Figure 3:
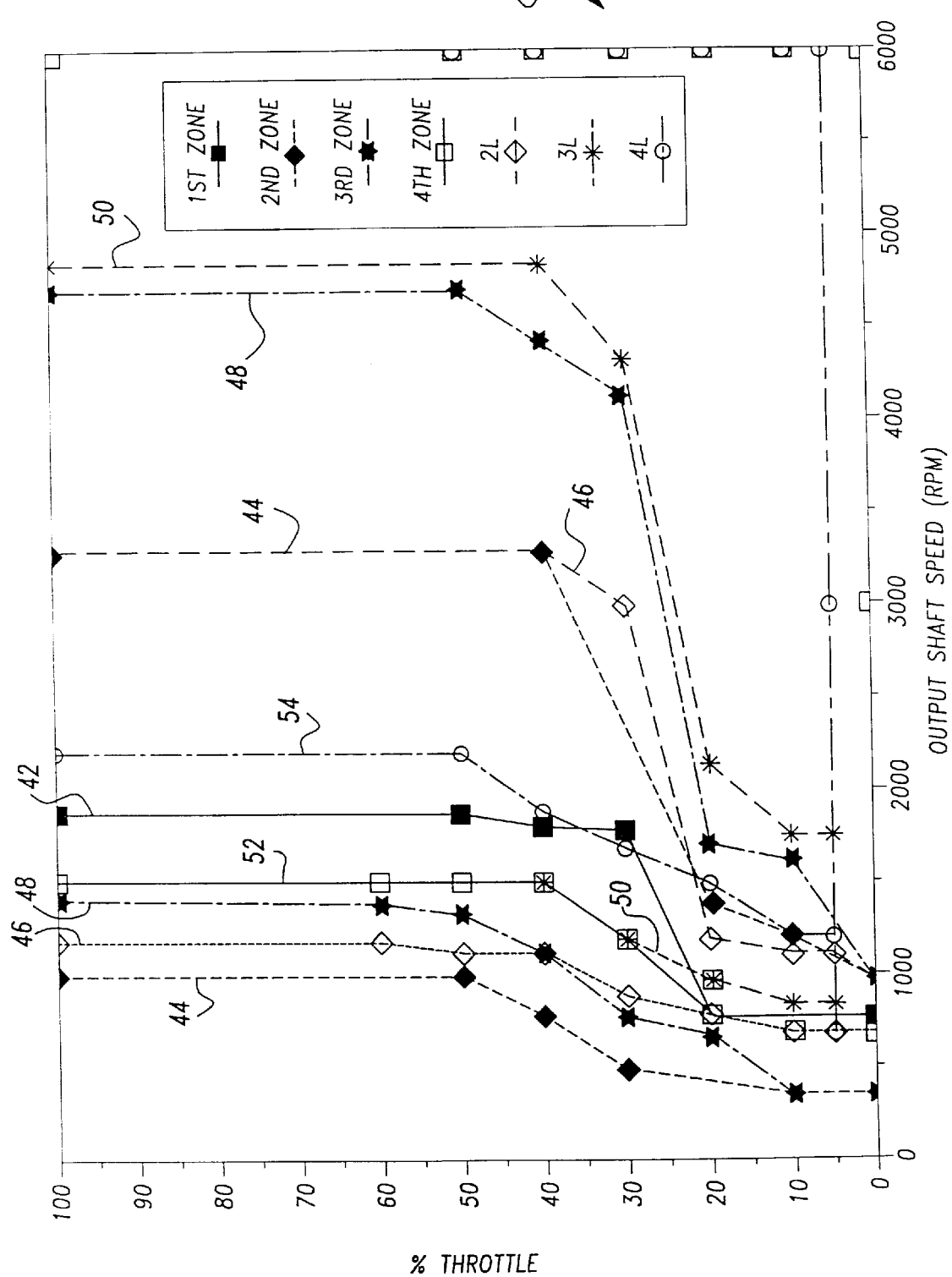
FIG. 3 is a graphical representation of allowable shift zones for an automatic transmission of a vehicle as a function of output shaft speed and throttle opening percentage.

With particular reference to FIG. 3, one example of a shift zone table 30 is illustrated therein. Shift zone table 30 shows shift zones for each of the transmission gears as a function of output shaft speed and throttle percentage opening. The shift zone for first gear is defined by the region to the left of line 42. The region between lines 44 defines the allowable shift zone for second gear, while the region between lines 48 defines the allowable shift zone for third gear. The allowable shift zone for fourth gear is defined by the region to the right of line 52. The automatic transmission as described herein includes a converter clutch for providing converter lockup. Accordingly, shift points are provided as shown herein for the converter clutch lockup based on a full lock torque value. The allowable shift zone for a second gear converter clutch lockup is defined by the region between lines 46, while the allowable shift zone for a third gear converter clutch lockup is defined by the region between lines 50. Finally, the allowable shift zone for a fourth gear converter clutch lockup is defined by the region to the right of line 54.

Accordingly, the automatic transmission may shift among the available gears which include first gear through fourth gear as well as converter lockups for second gear through fourth gear. It should be appreciated that reference to a gear shift may include a shift between gears, a shift between a gear with the converter unlocked and a gear lockup or a shift between gear lockups. Available gear shifts are limited to the region provided by the allowable shift zones as defined in the shift zone table 30 of FIG. 3.

Figure 4:
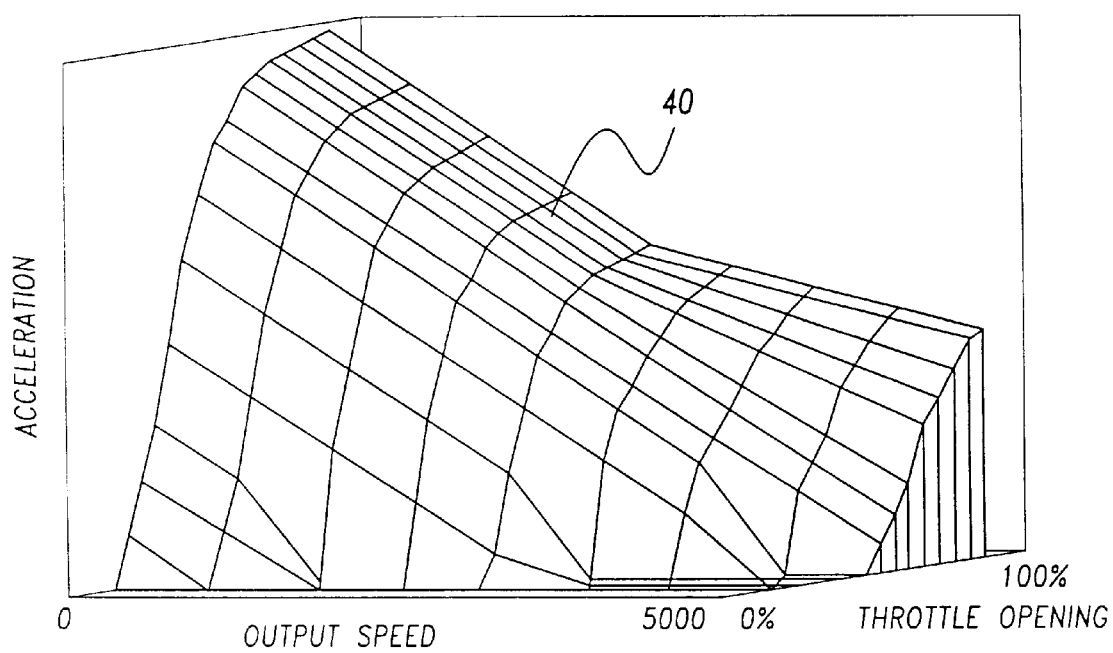
FIG. 4 is a three-dimensional look-up surface which illustrates the allowable shift points for an upshift of the transmission as a function of acceleration, output speed and throttle opening percentage.

FIG. 4 illustrates one example of an upshift acceleration surface 40. The upshift acceleration surface 40 provides an acceleration threshold value which may be looked up as a function of the throttle percentage opening and turbine output speed as monitored on the vehicle. The acceleration threshold value is then compared with a projected acceleration value to determine whether a upshift of the automatic transmission is appropriate. Similarly, the downshift acceleration surface 38 likewise provides an acceleration threshold value as a function of throttle percentage opening and turbine output speed. The downshift acceleration surface 38 acceleration threshold value is compared to the current acceleration to determine whether a downshift of the automatic transmission is appropriate.

Figure 5:
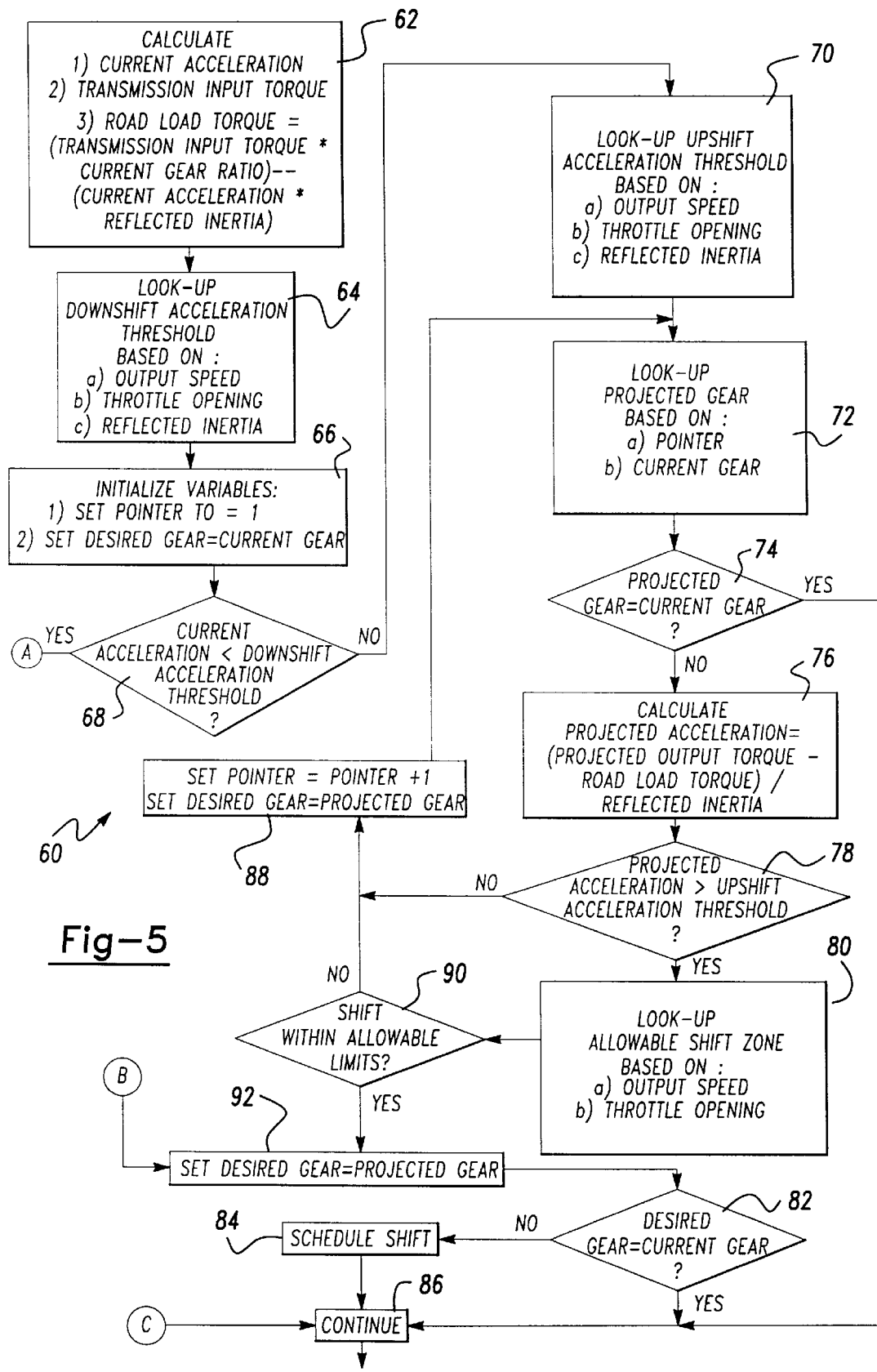
FIGS. 5 and 5A together provide a flow diagram illustrating an acceleration based shift control strategy for an automatic transmission in accordance with the present invention.
Figure 5A:
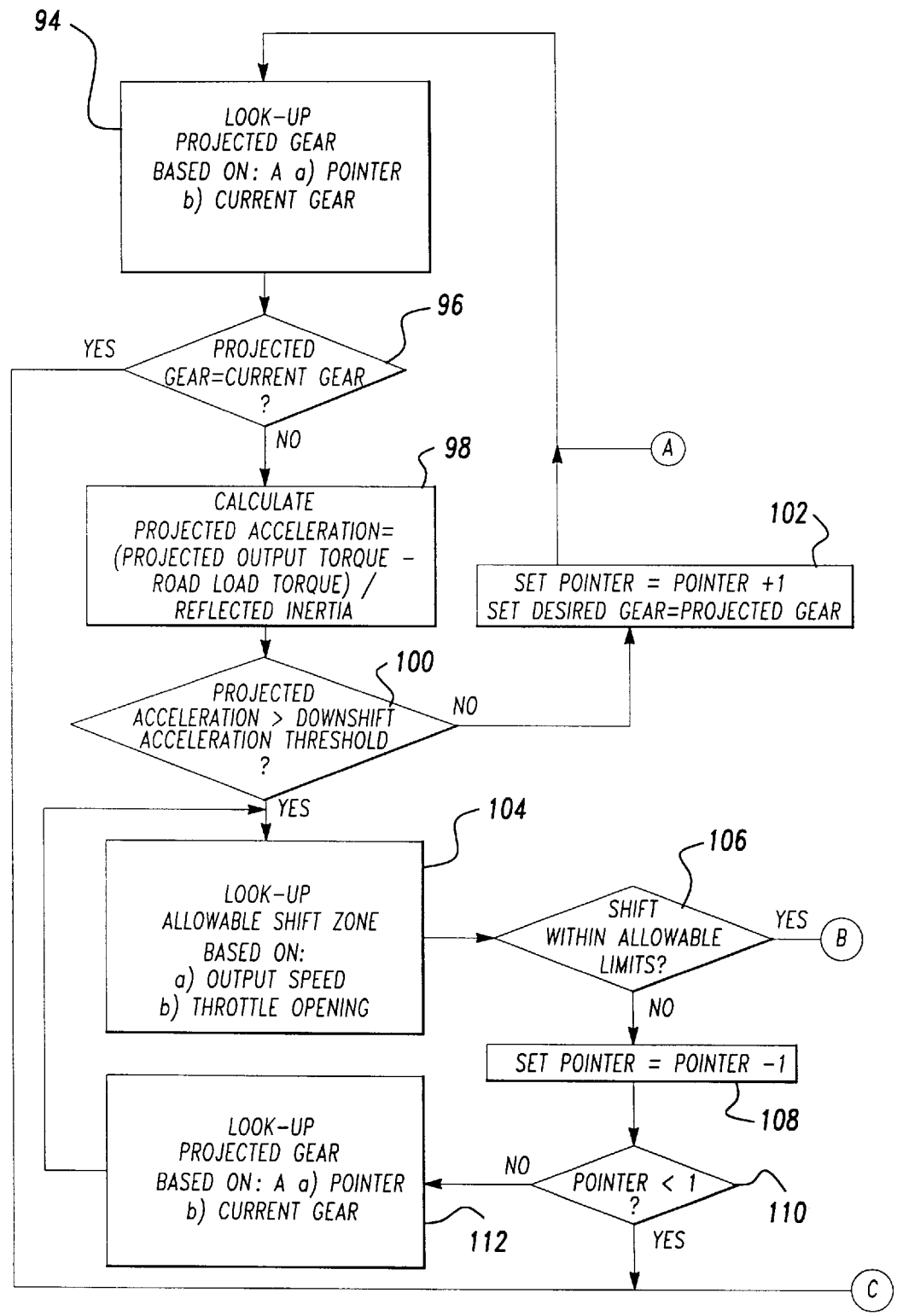

Referring to FIGS. 5 and 5A, an acceleration based shift control methodology 60 is illustrated for determining upshift and downshift shift points and controlling gear shifting of the automatic transmission in accordance with the present invention. Shift control methodology 60 uses sensed vehicle parameters and repeatedly calculates the output shaft acceleration $\alpha_n$ for the current engaged transmission gear (n) as provided in block 62. Shift control methodology 60 also calculates transmission input torque. Shift control methodology 60 further calculates the vehicle road load torque $T_{RL}$ at the transmission output shaft as a function of the difference between the product of calculated transmission input torque and the current gear ratio and the product of the current acceleration and vehicle reflected inertia (I). Vehicle reflected inertia (I) as well as road load torque $T_{RL}$ can be determined as described in co-pending U.S. patent application Ser. No. 08/672,883, entitled "Anti-Hunt Strategy for an Automatic Transmission", filed on Jun. 28, 1996 and assigned to the Assignee of the present application. The aforementioned pending U.S. patent application is incorporated herein by reference.

Shift control methodology 60 initially determines a learned vehicle reflected inertia (I) while the automatic transmission is performing a transmission gear upshift. The optimal condition for determining vehicle inertia is found to be under conditions where a significant change in output torque occurs while the road load remains relatively constant. A change in gear ratio during a transmission shift meets these requirements with a sharp change in output torque that is determined by a look-up table. Shift control methodology 60 initially determines a learned vehicle inertia (I) while the automatic transmission is performing a transmission gear upshift. According to a preferred embodiment, shift control methodology 60 will determine vehicle inertia (I) during the first transmission gear upshift from first gear to second gear (e.g., 1-2 upshift) following each time the vehicle is stopped. Therefore, the learned vehicle inertia I adapts to changes in inertia as determined after each vehicle stop.

To determine vehicle inertia (I), shift control methodology 60 will check to see if a first gear-to-second gear (1-2) upshift is currently in progress. If the 1-2 upshift is detected, shift control methodology 60 proceeds to check to see if the second gear has been detected. If second gear has not yet been detected, the strategy will check to see if the 1-2 shift has just started and, if so, shift control methodology 60 will calculate output torque ($T_n$) for the currently engaged transmission gear (n), and thereafter will store the output shaft torque $T_n$ and acceleration $\alpha_n$ in memory. The output torque $T_n$ as referred to herein is the torque at the output of the transmission. The transmission input torque is determinable from the output torque and gear ratio.

Once second gear has been detected, shift control methodology 60 checks if a timer has expired. The timer provides a time delay during which the abrupt transmission gear transition generally is known to occur which causes disturbance of the output torque that is to be avoided in the measurement. Once the timer has expired, shift control methodology 60 calculates the output shaft torque $T_{n+1}$ for the upshift gear (n+1). Output shaft torque $T_{n+1}$ is the output shaft torque calculated for the transmission gear upshift which in this case is second gear. Thereafter, shift control methodology 60 will calculate vehicle inertia I. Vehicle inertia I can be calculated by dividing the difference in output torque in first gear and second gear represented by $(T_n-T_{n+1})$ by the difference in acceleration in the first gear and second gear represented by $(\alpha_n-\alpha_{n+1})$. These torque and acceleration measurements are preferably taken in first gear just prior to the upshift and in second gear just after the upshift occurs. It is preferred that the measurements be taken during the shortest time period possible without realizing effects caused by the shift induced disturbance. This also allows the assumption of a constant road load torque $T_{RL}$.

Once the vehicle inertia I has been determined, the road load torque $T_{RL}$ at the transmission output shaft can be calculated. The torque $T_n$ at the transmission output shaft is equal to the product of vehicle inertia I and acceleration $\alpha_n$ summed with road load torque $T_{RL}$. Road load torque $T_{RL}$ generally includes torque losses which take into consideration aerodynamic drag of the vehicle, rolling resistance of the tires and frictional losses in the drivetrain as well as the grade of the road that the vehicle is traveling on. In effect, the output torque from the transmission will be consumed by the road load torque or be expressed as an acceleration of the output shaft.

Proceeding to block 64, shift control methodology 60 looks up a downshift acceleration threshold value based on turbine output speed, the throttle percentage opening and calculated vehicle reflected inertia. Next, shift control methodology 60 will initialize variables by setting a pointer equal to one and setting the desired gear to the current gear as provided in block 66. Shift control methodology 60 will then proceed to decision block 68 to compare the calculated current acceleration with the looked up downshift acceleration threshold value. If the calculated current acceleration is equal to or greater than the looked up downshift acceleration threshold value, methodology 60 proceeds to block 70 to look up the upshift acceleration threshold value based on turbine output speed, throttle percentage opening and vehicle reflected inertia. Methodology 60 will also look up the projected gear based on the pointer and the current gear as provided in block 72. Decision block 74 checks for whether the projected gear is equal to the current gear of the automatic transmission and, if so, no shift is necessary and methodology 60 proceeds to continue block 86. Otherwise, if the projected gear is not equal to the current gear, shift control methodology 60 proceeds to block 76 in which the projected acceleration is calculated as a function of the difference between projected output torque and road load torque divided by the vehicle reflected inertia.

Methodology 60 then compares the projected acceleration to the upshift acceleration threshold as provided in decision block 78. If the projected acceleration is less than or equal to the upshift acceleration threshold, methodology 60 proceeds to increment the pointer by one and to set the desired gear equal to the projected gear as provided in block 88 and then proceeds to block 72. Otherwise, if the projected acceleration is greater than the upshift acceleration threshold, methodology 60 will proceed to block 80 to look up the allowable shift zone based on output shaft speed and throttle percentage opening. Decision block 90 then checks to see if the gear shift is within the allowable limits of the shift zone, and if not proceeds to block 88. Otherwise, if the shift is within the allowable limits, methodology 60 proceeds to block 92 to set the desired gear equal to the projected gear. Thereafter, decision block 82 performs a check to see if the desired gear has already been set equal to the current gear and, if so, is complete and proceeds to continue block 86. Otherwise, methodology 60 schedules a shift pursuant to block 84 and is thereafter complete pursuant to continue block 86.

Referring back to decision block 68, if the calculated current acceleration is determined to be less than the downshift acceleration threshold, methodology 60 proceeds to block 94 to look up the projected gear based on the pointer and the current gear. The projected gear is compared with the current gear as provided in decision block 96. If the projected gear is equal to the current gear, shift control methodology 60 is complete and proceeds to continue block 86. Otherwise, if the projected gear is not equal to the current gear, methodology 60 will proceed to calculate the projected acceleration as a function of the difference between projected output torque and road load torque divided by the vehicle reflected inertia as provided block 98. Thereafter, decision block 100 compares the projected acceleration with the downshift acceleration threshold. If the projected acceleration is greater than the downshift acceleration threshold, the pointer is incremented and the desired gear is set equal to the projected gear as provided in block 102, and methodology 60 thereafter proceeds back to block 94. Otherwise, if the projected acceleration is equal to or less than the desired acceleration, methodology 60 will proceed to look up the allowable shift zone based on output shaft speed and throttle percentage opening as provided in block 104. Thereafter, decision block 106 checks to see if the projected gear shift is within the allowable limits as determined by the allowable shift zone and, if so, proceeds to block 92. Otherwise, if the shift is not within the allowable shift limits, methodology 60 proceeds to decrement the pointer as provided in block 108 and thereafter decision block 110 checks to see if the pointer is less than a value of one. If the pointer has decremented to a value of less than one, methodology 60 is complete and proceeds to continue block 86. Otherwise, methodology 60 proceeds to block 112 to look up the projected gear based on the pointer and the current gear and thereafter proceeds to block 104.

In operation, the shift control methodology 60 will detect when the vehicle is stopped and thereafter calculate the vehicle inertia I. This is accomplished by looking up the output shaft torque in first gear just prior to an upshift and looking up torque in the upshift gear just after the upshift occurs. Likewise, acceleration is measured in first gear just prior to an upshift and also just after the upshift occurs to second gear. Vehicle inertia is then calculated as a difference in torque divided by the difference in acceleration. To account for vehicle losses, shift control methodology 60 calculates a road load torque as a function of the output shaft torque, vehicle inertia and acceleration.

Shift control methodology 60 determines post shift acceleration for either an upshift or a downshift for the next upshift or downshift gears to be considered. Methodology 60 looks to a prioritized table for upshift gears and a prioritized table for downshift gears and determines whether the acceleration either positive or negative, that is achievable is acceptable for the currently considered gear. While methodology 60 looks at acceleration, the acceleration may be either a positive or negative value. If an upshift or a downshift is allowable, the gear shift may occur.

While a specific embodiment of the invention has been shown and described in detail to illustrate the principles of the present invention, it should be understood that the invention may be embodied otherwise without departing from such principles. For example, one skilled in the art will readily recognize from such discussion and from the accompanying drawings that various changes, modifications and variations can be made without departing from the spirit and scope of the present invention as described in the following claims.

What is claimed is:

1. A method of adaptively controlling transmission gear upshifts in an automatic transmission of a vehicle, said method comprising the steps of:

determining a vehicle inertia;

determining if a current acceleration is less than a downshift acceleration threshold and, if not, obtaining an upshift acceleration threshold based on reflected inertia of said vehicle and a throttle opening of a throttle of said vehicle;

determining if a calculated projected acceleration is greater than said obtained upshift acceleration threshold;

if said calculated projected acceleration is greater than said upshift acceleration threshold, then determining if an upshift will be within an allowable shift zone and, if so, extending said upshift.

2. A method of adaptively controlling transmission gear downshifts in an automatic transmission of a vehicle, said method comprising the steps of:

determining output torque of an automatic transmission;

determining a learned vehicle inertia;

determining if a current acceleration of said vehicle is less than a downshift acceleration threshold and, if so, determining a projected gear based on said determined torque output, calculating projected acceleration based on said learned vehicle inertia and said projected gear, and determining if said projected acceleration is greater than said downshift acceleration threshold;

if said projected acceleration is greater than said downshift acceleration threshold, then determining if a shift can be made which is within an allowable shift zone and, if so, executing said shift.

3. The method as defined in claim 2 wherein when the predicted post shift acceleration is not within a desired range the method further comprises the steps of:

selecting the next possible downshift from a hierarchy table;

predicting an expected post shift acceleration for the next selected one of the upshifts;

comparing the predicted post shift acceleration of the next selected downshift to a threshold value; and initiating a transmission downshift as a function of the step of comparing the post shift acceleration to the next selected downshift.

4. A method of adaptively controlling transmission gearshifts in an automatic transmission of a vehicle, said method comprising the steps of:

determining output torque of an automatic transmission;

determining a learned vehicle inertia;

determining if a current acceleration is less than a downshift acceleration threshold and, if not, obtaining an upshift acceleration threshold based on vehicle speed, a throttle opening of a throttle of said vehicle and said learned vehicle inertia;

selecting possible upshifts one at a time from an upshift hierarchy table in an ordered sequence;

predicting an expected post upshift acceleration for the selected one of the upshifts from the upshift hierarchy table;

comparing the predicted post upshift acceleration of the selected upshift to an upshift threshold value;

initiating a transmission upshift to the selected upshift when the predicted post upshift acceleration exceeds the upshift threshold value;

selecting possible downshifts one at a time from a downshift hierarchy table in an ordered sequence;

predicting an expected post downshift acceleration for the selected one of the downshifts from the downshift hierarchy table;

comparing the predicted post downshift acceleration to a downshift threshold value; and initiating a transmission downshift to the selected downshift when the predicted post downshift acceleration value is greater than the downshift threshold value.

* * * * *